D. & A. S. MARKHAM.
Corn-Planter.
No. 18,346.  Patented Oct. 6, 1857.
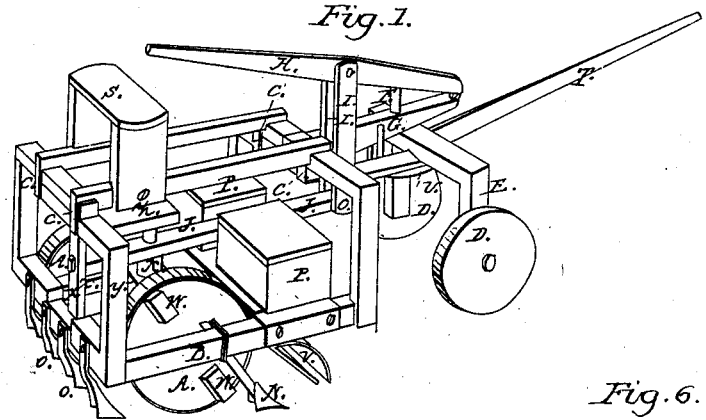
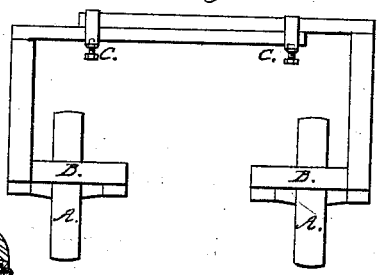
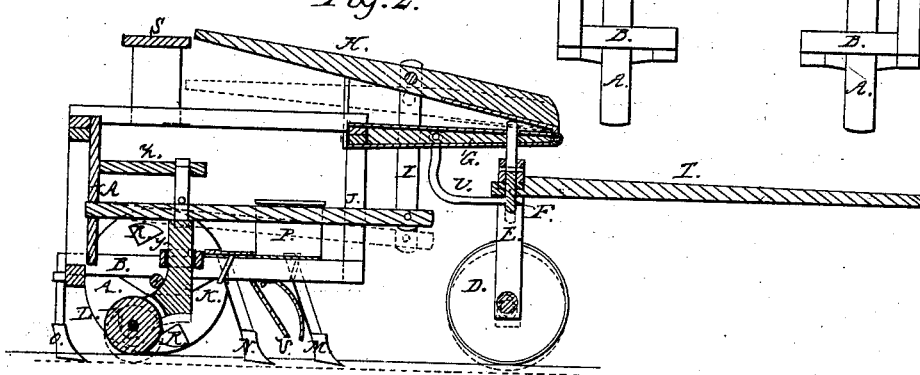
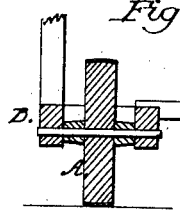
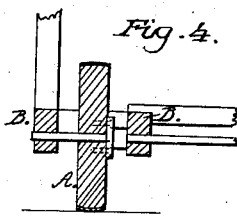
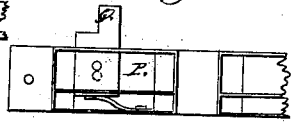
Witnesses:
E. A. Paine
S. O. Tourtellott
Inventor:
Daniel Markham
Austin S. Markham

UNITED STATES PATENT OFFICE.

DANIEL MARKHAM AND AUSTIN S. MARKHAM, OF MONMOUTH, ILLINOIS.

IMPROVEMENT IN SEEDING-MACHINES.

Specification forming part of Letters Patent No. 18,346, dated October 6, 1857.

*To all whom it may concern:*

Be it known that we, DANIEL MARKHAM and AUSTIN S. MARKHAM, of Monmouth, in the county of Warren and State of Illinois, have invented certain new and useful Improvements in a Combined Seed-Planter and Seed-Sowing Machine, which we have described in the following specification and illustrated in the accompanying drawings with sufficient clearness to enable others of competent skill to make and use our invention.

Our invention consists in the form and arrangement of a screen through which the wheat is sown, by which we obtain a more even distribution of the seed than would otherwise be the case.

In the accompanying drawings, Figure 1 is a perspective view of our improved machine. Fig. 2 is a longitudinal sectional elevation. Fig. 3 is a detail sectional elevation taken through the center of one of the traction-wheels. Fig. 4 is a sectional elevation of the same thing, showing one wheel attached to a continuous shaft which extends to the other wheel. Fig. 5 is the plan of a portion of the seed-boxes. Fig. 6 is an end elevation of certain parts, viewed from the back end, the object being to represent the method of diminishing the width of the machine for planting rows at different distances apart.

A A are the traction-wheels, hung in a frame, B B. The traction-wheels support the back end of the machine. The forward end of the machine rests upon the wheels D, which are hung upon a bent axle, E. This axle receives the bolt F, which secures it to the forward end of the frame by passing through the center piece, G. This bolt slides freely through the center piece, G, and upon the end of it the lever H rests. This lever H is hinged to the center piece, G, at the forward end. It is also connected by connecting-straps I to the lever J. This lever J operates upon the shaft K of the caster-wheel L, and by pressing this lever down upon the shaft of the caster-wheel the back part of the machine may be raised sufficiently to raise the plows out of the ground and lift the traction-wheels from the surface. The forward end is raised at the same time by the lever H pressing down upon the king-bolt F, which is supported by the forward wheels. By this means the operator may raise the plows from the ground when desirable to turn the machine, and also by raising the traction-wheels at the same operation stop the seeding apparatus, and the whole back part of the machine resting upon the caster-wheel renders it very easy to turn in any direction, so that it may be turned at the end of the row with the utmost facility to the proper position for commencing the next row.

M N O are the plows, attached to the frame as represented. These plows respectively prepare the ground for the reception of the seed and cover it after it has dropped. In planting in rows the plows O should be removed.

P P are the seed-boxes, from which the seed is allowed to fall by operating the valve Q. These valves are operated by cams R on the traction-wheels.

S is a seat for the driver.

T is the tongue by which the machine is drawn.

The connection of the axle E to the forward cross-beam is strengthened by a strap or stirrup, U.

In sowing seed broadcast or in close drills as nearly a continuous seed-box as may be should be used. The seed falls from the seed-box into the screen V, which is open at the top and so made as to shelter the seed from the wind. The back part of it is an inclined plane, upon which the seed falls, and which tends to distribute the seed in its passage to the ground. The forward part of this screen is curved and extends a little nearer to the ground for the purpose of preventing the wind from affecting the grain from the direction opposite to that in which the machine is being drawn.

In planting the markers W serve to show the position of the seed. Should it be desirable to reduce the depths of the furrows to less than what the plows will naturally cut, it may be done by fastening the lever H in any required position.

The shaft of the caster-wheel is supported in two pieces of timber, Y and Z.

Having thus fully described our invention, we claim—

The inclined screen with the overhanging lip upon the forward side for protecting the grain from the wind, arranged as set forth.

DANIEL MARKHAM.
AUSTIN S. MARKHAM.

Witnesses:
E. A. PAINE,
L. O. TOURTELLOTT.